No. 628,226. Patented July 4, 1899.
E. P. MASON.
LOOM.
(Application filed Mar. 2, 1899.)
(No Model.)
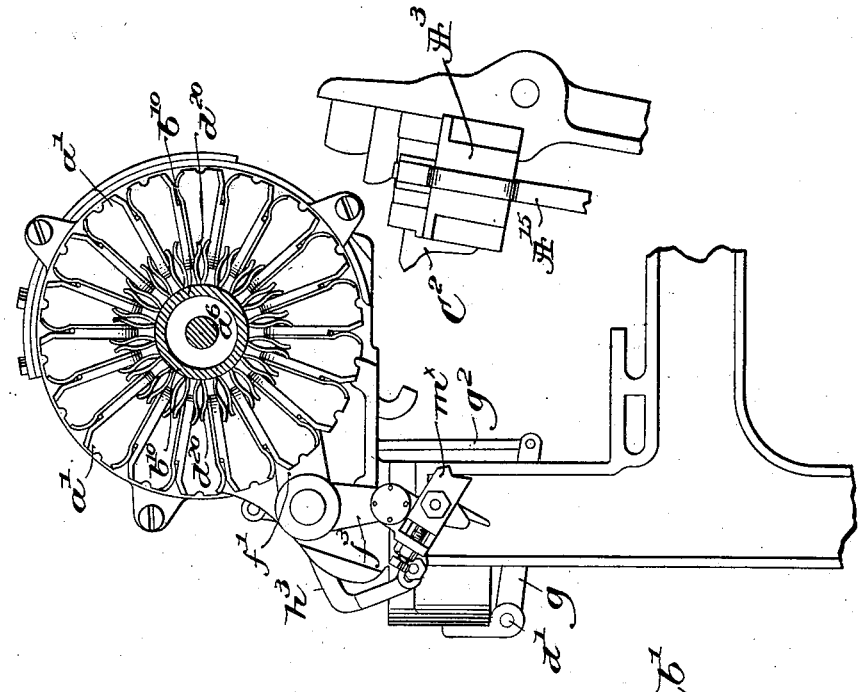
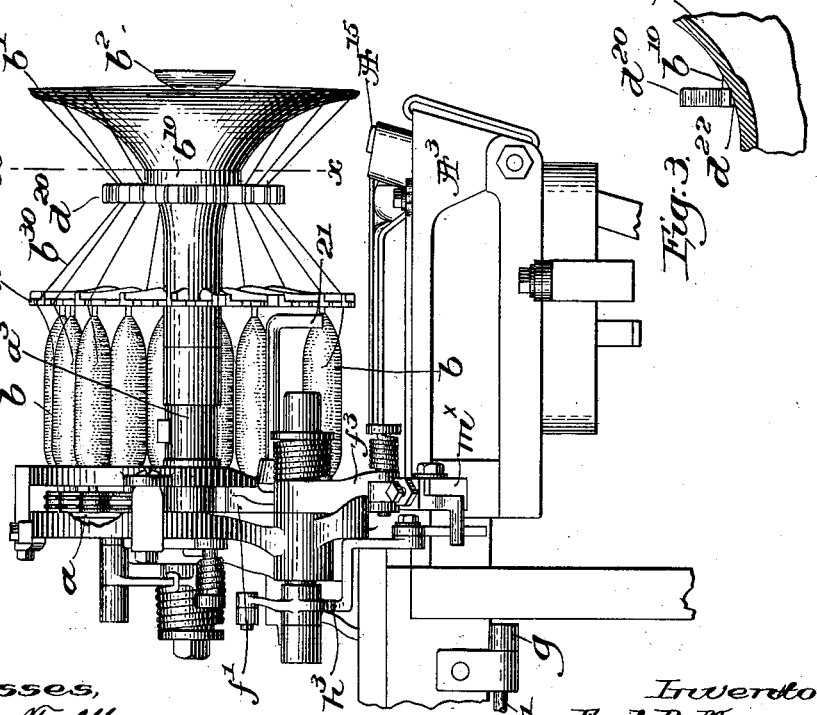
Witnesses,
Edward F. Allen.
James M. Urquhart.
Inventor,
Earl P. Mason,
By Crosby & Gregory.
attys.

UNITED STATES PATENT OFFICE.

EARL P. MASON, OF NEWPORT, RHODE ISLAND, ASSIGNOR TO THE DRAPER COMPANY, OF PORTLAND, MAINE, AND HOPEDALE, MASSACHUSETTS.

LOOM.

SPECIFICATION forming part of Letters Patent No. 628,226, dated July 4, 1899.

Application filed March 2, 1899. Serial No. 707,445. (No model.)

*To all whom it may concern:*

Be it known that I, EARL P. MASON, of Newport, county of Newport, State of Rhode Island, have invented an Improvement in Automatic Looms, of which the following description, in connection with the accompanying drawings, is a specification, like letters and figures on the drawings representing like parts.

In looms provided with automatic filling-supplying mechanism the several filling-carriers are mounted ready for use in a suitable hopper or feeder, from which they are transferred singly to the shuttle as occasion demands, such a type of loom being shown in United States Patent No. 529,940, dated November 27, 1894, the hopper therein shown consisting, essentially, of two parallel substantially circular plates mounted to rotate intermittingly and in unison, the several filling-carriers being supported between them. The filling ends in said patent are led directly from the filling-carriers over the edge of a circular disk and then secured to a stud at the outer face of the disk, and in such construction it has been found that the sharp blow of the picker on a shuttle having a fresh supply of filling subjects the filling end to such a sudden strain or shock that it frequently breaks before the filling begins to unwind from the end of the filling-carrier. In order to overcome this objection, means have been herein provided for furnishing an additional length of filling end between the filling-carrier and the point at which the filling end is held, so that as the shuttle leaves the box this extra length of filling will be given up and time afforded for the filling to unwind before the strain is exerted upon the filling end. By deflecting the filling end between the hopper and the holding device the requisite slack or extra length of filling is provided, and to prevent tangling of the several slack portions each is normally held substantially taut by a detent, which latter releases the filling when subjected to a slight longitudinal strain.

Figure 1 is a front elevation of a filling feeder or hopper with the filling-end holder and a portion of the lay, sufficient to be understood, with my present invention embodied therein. Fig. 2 is a partial transverse sectional view thereof on the line $x$ $x$, Fig. 1, looking toward the left; and Fig. 3 is a sectional detail showing the manner of securing the detents in place.

Referring to Fig. 1, the filling feeder or hopper, comprising the disks or plates $a$ $a'$, the hub or sleeve $a^3$, connecting them, to rotate on the stud $a^6$, Fig. 2, the transferrer $f'$ to act against the head of a filling-carrier $b$ and provided with a finger 21 to act against the tip of the filling-carrier, and the lay $A^3$, having a bunter $C^2$, and the picker-stick $A^{15}$ may be and are substantially as shown in the patent referred to, as are also the disk-like filling-end support $b'$ and the stud $b^2$, to which the ends of filling are secured.

The spring-controlled dog $m^\times$, mounted on the depending end $f^3$ of the transferrer, the actuating rock-shaft $d'$, and the controlling connections $g$ $g^2$ $h^3$ between it and the dog $m^\times$, whereby the latter is moved into the path of the bunter $C^2$ upon failure of the filling, are and may be substantially as shown in United States Patent No. 600,016, dated March 1, 1898, to which reference may be had.

In my present invention the filling ends are not led directly from the disk $a'$ of the hopper to the support $b'$, but they are deflected between the said parts to form an additional length or slack portion, as $b^{30}$, Fig. 1, which is taken up as the shuttle leaves the shuttle-box with its fresh supply of filling, and in order to preserve this slack or extra portion of the filling end and to prevent the several ends from tangling each filling end is normally engaged by a detent between the hopper and filling-end support.

Referring to Fig. 3, the detents $d^{20}$ are shown as yieldingly-closed jaws, preferably made of light spring metal, set into slots or saw-cuts $d^{22}$, made in the enlarged portion or shoulder $b^{10}$, forming a part of the support $b'$, one of the detents being provided for each filling-carrier in the hopper.

When the attendant loads the hopper, he draws off from the filling-carrier a sufficient length of filling to enter between the jaws of the appropriate detent, and the loose end is then carried over the support $b'$ and secured to the stud $b^2$, the deflection of the filling end thus effected providing sufficient slack or length to be given up when the filling is transferred and the shuttle thrown from the box.

A very slight pull on the filling end will suffice to disengage it from the detent, the spring action of which is purposely made light and delicate.

So long as a filling-carrier remains in the hopper, however, the detent will retain its hold upon the filling-end slack and prevent it from flying about or becoming displaced.

I have shown one practical embodiment of my invention; but my invention is not restricted thereto, as the same may be modified or rearranged without departing from the spirit and scope of the invention.

Having fully described my invention, what I claim, and desire to secure by Letters Patent, is—

1. In filling-changing mechanism for looms, a hopper or feeder to contain a supply of filling, a filling-end holder at the outer end thereof, between which and the hopper a slack or surplus portion of filling is provided, and a resilient detent to normally engage such slack portion of the filling.

2. In filling-changing mechanism for looms, a hopper or feeder to contain a plurality of supplies of filling, a holder for the several ends of filling, located at the outer end of the hopper or feeder, and individual means to normally engage surplus or slack portions of each of the filling ends between the hopper and the holder.

3. In filling-changing mechanism for looms, a hopper or feeder to contain a plurality of supplies of filling, a holder for the several ends of filling, and a series of yielding detents to normally engage surplus or slack portions of the several filling ends between the hopper and the holder, longitudinal pull on the filling releasing it from its detent.

4. In filling-changing mechanism for looms, a hopper or feeder to contain a plurality of supplies of filling, a relatively-fixed holder for the filling ends, and a series of spring-jaws located between said hopper and the holder, the filling ends being deflected between the hopper and holder and brought into engagement with the said jaws, to be normally held thereby.

5. In filling-changing mechanism for looms, a rotatable hopper to contain a plurality of filling-carriers, means rotatable with said hopper to support and hold the several filling ends, and a series of detents located between said hopper and holding means, to deflect the filling ends from their direct path and normally engage such deflected portions.

6. In filling-changing mechanism for looms, a hopper or feeder to contain a supply of filling, a filling-end holder located at the outer end of the hopper and between which and the hopper a slack or surplus portion of filling is provided, and resilient means to yieldingly engage and hold such slack portion of the filling.

In testimony whereof I have signed my name to this specification in the presence of two subscribing witnesses.

EARL P. MASON.

Witnesses:
GEO. OTIS DRAPER,
ALBERT H. COUSINS.